United States Patent
Hanyu

(10) Patent No.: US 7,961,432 B2
(45) Date of Patent: Jun. 14, 2011

(54) HEAD, HEAD SUSPENSION ASSEMBLY, AND DISK DRIVE PROVIDED WITH THE SAME

(75) Inventor: Mitsunobu Hanyu, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/568,218

(22) Filed: Sep. 28, 2009

(65) Prior Publication Data

US 2010/0149691 A1    Jun. 17, 2010

(30) Foreign Application Priority Data

Dec. 12, 2008  (JP) .................................. 2008-317571

(51) Int. Cl.
*G11B 5/60* (2006.01)
(52) U.S. Cl. .................... 360/236.3; 360/235.7
(58) Field of Classification Search .... 360/235.4–237.9, 360/236.1–236.3
See application file for complete search history.

(56) References Cited

U.S. PATENT DOCUMENTS

| | | | | |
|---|---|---|---|---|
| 6,483,667 B1 * | 11/2002 | Berg et al. | ................... | 360/235.6 |
| 7,245,455 B2 * | 7/2007 | Rajakumar | ................... | 360/235.8 |
| 7,262,937 B2 * | 8/2007 | Pendray et al. | ............ | 360/235.1 |
| 7,463,452 B2 * | 12/2008 | Takahashi et al. | ......... | 360/235.8 |
| 7,505,228 B2 * | 3/2009 | Hanyu | ...................... | 360/235.6 |
| 7,652,846 B2 * | 1/2010 | Kondo | ........................ | 360/235.8 |
| 7,656,616 B2 * | 2/2010 | Matsumoto | ................ | 360/235.7 |
| 7,719,794 B2 * | 5/2010 | Hanyu et al. | ................ | 360/235.6 |
| 2002/0075600 A1 * | 6/2002 | Schnur et al. | .............. | 360/235.8 |
| 2004/0032693 A1 * | 2/2004 | Imamura et al. | ........... | 360/235.7 |
| 2006/0268460 A1 * | 11/2006 | Kondo | ........................ | 360/235.8 |
| 2007/0058296 A1 | 3/2007 | Hashimoto et al. | | |
| 2007/0091506 A1 * | 4/2007 | Nakamura et al. | ......... | 360/235.8 |
| 2007/0121238 A1 * | 5/2007 | Kondo et al. | .................... | 360/69 |
| 2007/0188925 A1 * | 8/2007 | Ishihara | ..................... | 360/235.8 |
| 2008/0123220 A1 | 5/2008 | Kajitani | | |

FOREIGN PATENT DOCUMENTS

| | | |
|---|---|---|
| JP | 2002-100143 | 4/2002 |
| JP | 2006-331532 | 12/2006 |
| JP | 2007-149205 | 6/2007 |
| JP | 4008642 | 9/2007 |

* cited by examiner

*Primary Examiner* — Brian E Miller
(74) *Attorney, Agent, or Firm* — Knobbe, Martens, Olson & Bear LLP

(57) ABSTRACT

According to an embodiment, a slider of a head is provided with a negative-pressure cavity 54 formed in a disk-facing surface, a leading step portion located on the upstream side of the negative-pressure cavity, a pair of side portions opposed to each other, a head mounting pad provided on the facing surface on an outflow side of the negative-pressure cavity with respect to an airflow and provided with a head portion, a positive-pressure generating pad which is arranged on the facing surface between a leading pad and the head mounting pad and configured to produce a positive pressure, and a pair of center skirts which are disposed on the outflow side of the positive-pressure generating pad and are shallower than the negative-pressure cavity.

9 Claims, 7 Drawing Sheets

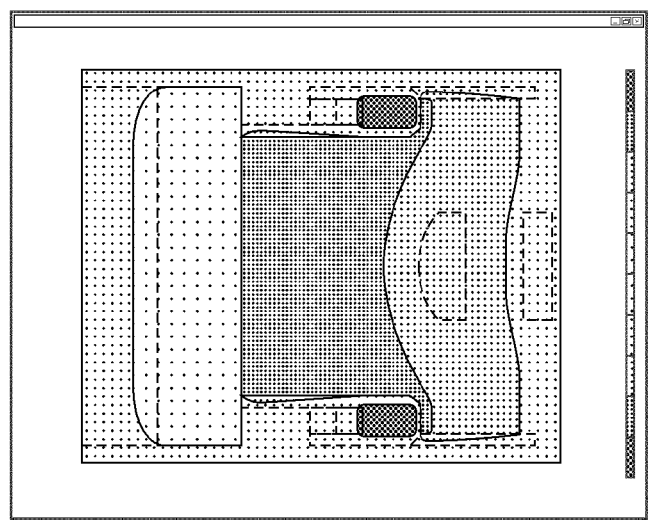
FIG. 7A   Pressure distribution of Comparative Example 1
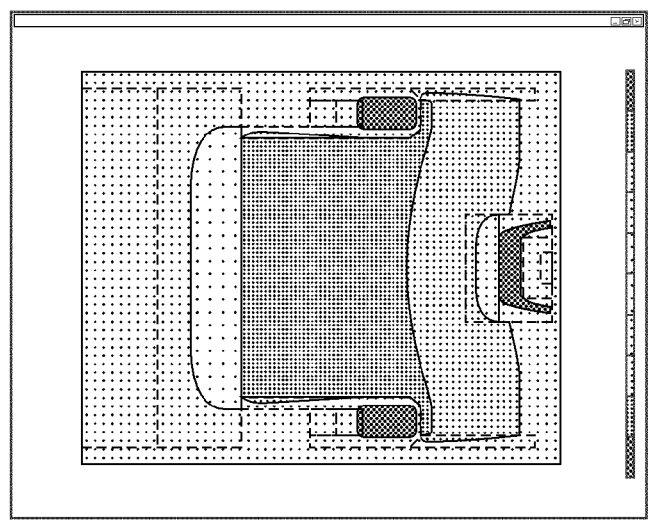
FIG. 7B   Pressure distribution of Comparative Example 2
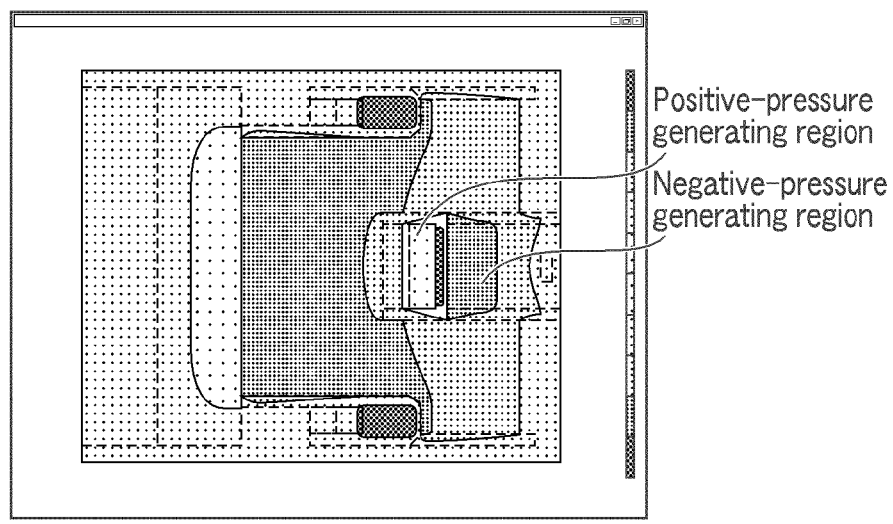
FIG. 7C   Pressure distribution of first embodiment

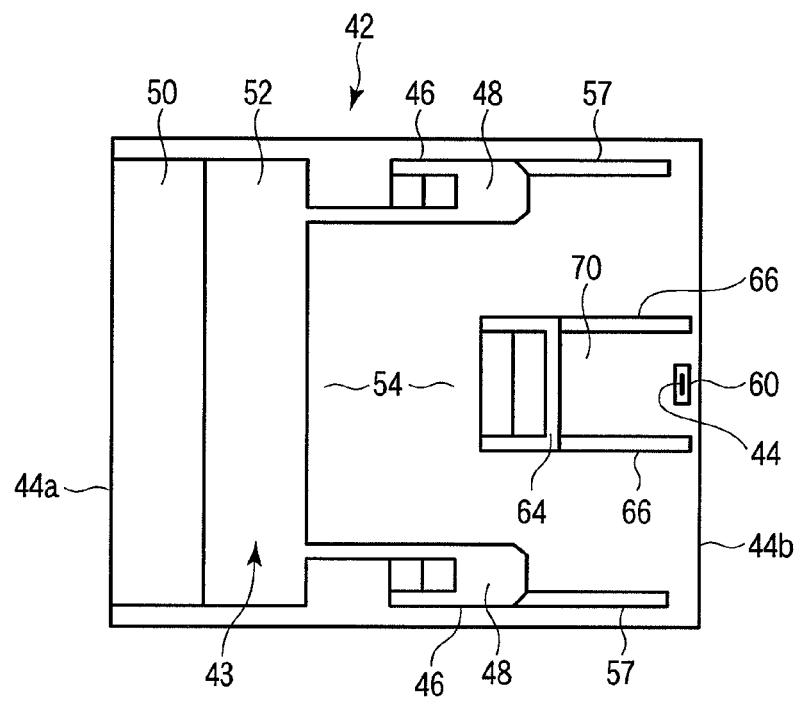
F I G. 9
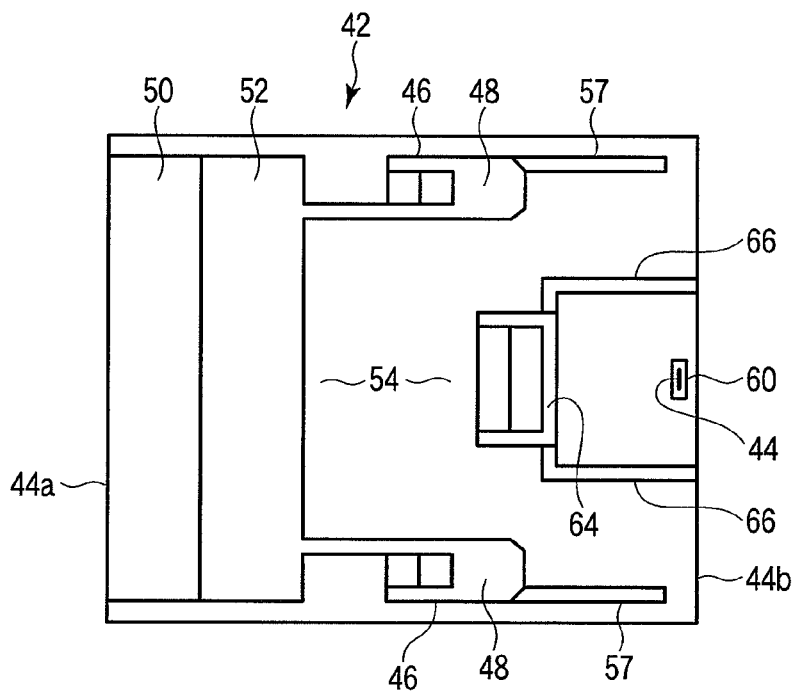
F I G. 10

HEAD, HEAD SUSPENSION ASSEMBLY, AND DISK DRIVE PROVIDED WITH THE SAME

CROSS-REFERENCE TO RELATED APPLICATIONS

This application is based upon and claims the benefit of priority from Japanese Patent Application No. 2008-317571, filed Dec. 12, 2008, the entire contents of which are incorporated herein by reference.

BACKGROUND

1. Field

An embodiment of the invention relates to a head used in a disk drive such as a magnetic disk drive, head suspension assembly provided with the head, and disk drive provided with the head suspension assembly.

2. Description of the Related Art

A disk drive, e.g., a magnetic disk drive, includes a magnetic disk, spindle motor, magnetic head, and carriage assembly. The magnetic disk is disposed in a case. The spindle motor supports and rotates the disk. The magnetic head writes and reads information to and from the disk. The carriage assembly supports the head for movement with respect to the disk. The carriage assembly includes a rotatably supported arm and a suspension extending from the arm. The magnetic head is supported on an extended end of the suspension. The head includes a slider attached to the suspension and a head portion on the slider. The head portion includes a reproducing element for reading and a recording element for writing.

The slider has a disk-facing surface or air bearing surface (ABS) opposed to a recording surface of the magnetic disk. A predetermined head load directed to a magnetic recording layer of the disk is applied to the slider by the suspension. When the magnetic disk drive operates, airflows are produced between the disk in rotation and the slider. Based on the principle of aerodynamic lubrication, a force (positive pressure) to fly the slider above the recording surface of the disk acts on the ABS of the slider. By balancing this flying force with the head load, the slider is flown with a gap above the recording surface of the disk. Jpn. Pat. Appln. KOKAI Publication No. 2007-73165, e.g., discloses a disk drive in which a negative-pressure cavity or dynamic-pressure generating groove is formed near the center of a facing surface of a slider in order to prevent variation of the flying height of the slider.

The slider includes the negative-pressure cavity formed at the central part of an ABS, a front pad portion formed on the air inflow-end side of the slider, and rear pad portion on the air outflow-end side of the slider. The rear pad portion is composed of an outflow-side step portion, outflow-side rail face continuous with the outflow-side step portion, groove deeper than the rail face, and outflow-side pad portion flush with the rail face. The front and opposite sides of the outflow-side pad portion are surrounded by the outflow-side rail face. A magnetic transducer that constitutes the head portion is provided on the outflow-side pad portion.

Airflows between the disk surface and the ABS of the slider produce positive pressures at the front pad portion, rear pad portion, and outflow-side pad portion. Thereupon, the slider maintains a flying posture in which the outflow-side pad portion is located closest to the disk surface.

A discrete track recording (DTR) disk has recently been provided as a magnetic disk with improved recording density. In this magnetic disk, grooves are formed between adjacent tracks so that interference between the adjacent tracks is reduced.

In writing or reading information to or from a rugged recording surface of the DTR disk by using the magnetic head described above, the positive pressures produced at the individual pad portions of the slider change due to variation of irregularities of the recording surface or fine dust produced as media are machined. In consequence, the flying height of the slider varies considerably. The pressure produced at the outflow-side pad portion that is located closest to the disk surface is particularly liable to variation. If the flying height of the slider varies in this manner, it is difficult to stably record and reproduce information on and from the disk.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIGS. 7A, 7B and 7C are exemplary diagrams showing pressure distributions of the sliders of Comparative Examples 1 and 2 and the present embodiment, respectively;

FIG. 9 is an exemplary plan view showing a slider of a magnetic head according to a second embodiment of the invention; and FIG. 10 is an exemplary plan view showing a slider of a magnetic head according to a third embodiment of the invention.

DETAILED DESCRIPTION

Various embodiments according to the invention will be described hereinafter with reference to the accompanying drawings. In general, according to one embodiment of the invention, a head comprises: a slider which includes a facing surface opposed to a surface of a rotatable recording medium and is configured to fly by an airflow which is produced between the surface of the recording medium and the facing surface as the recording medium rotates; and a head portion provided on the slider and configured to record and reproduce information on and from the recording medium. The facing surface of the slider includes a first direction along the airflow and a second direction perpendicular to the first direction. The slider includes a negative-pressure cavity which is defined by a recess formed in the facing surface and configured to produce a negative pressure, a leading step portion provided on the facing surface and located on an inflow side of the negative-pressure cavity with respect to the airflow, a pair of side portions which are individually arranged on the facing surface, extend from the leading step portion toward an outflow end of the slider, and are opposed to each other with a space therebetween in the second direction, a head mounting pad provided on the facing surface on an outflow side of the negative-pressure cavity with respect to the airflow and provided with the head portion, a positive-pressure generating pad which is arranged on the facing surface at a distance from the head mounting pad, on the outflow side with respect to the airflow, and configured to produce a positive pressure, and a pair of center skirts which are arranged on the outflow side of the positive-pressure generating pad and are shallower than the negative-pressure cavity.

A first embodiment of this invention, applied to a hard disk drive (HDD), will now be described in detail with reference to the accompanying drawings.

Figure 1:
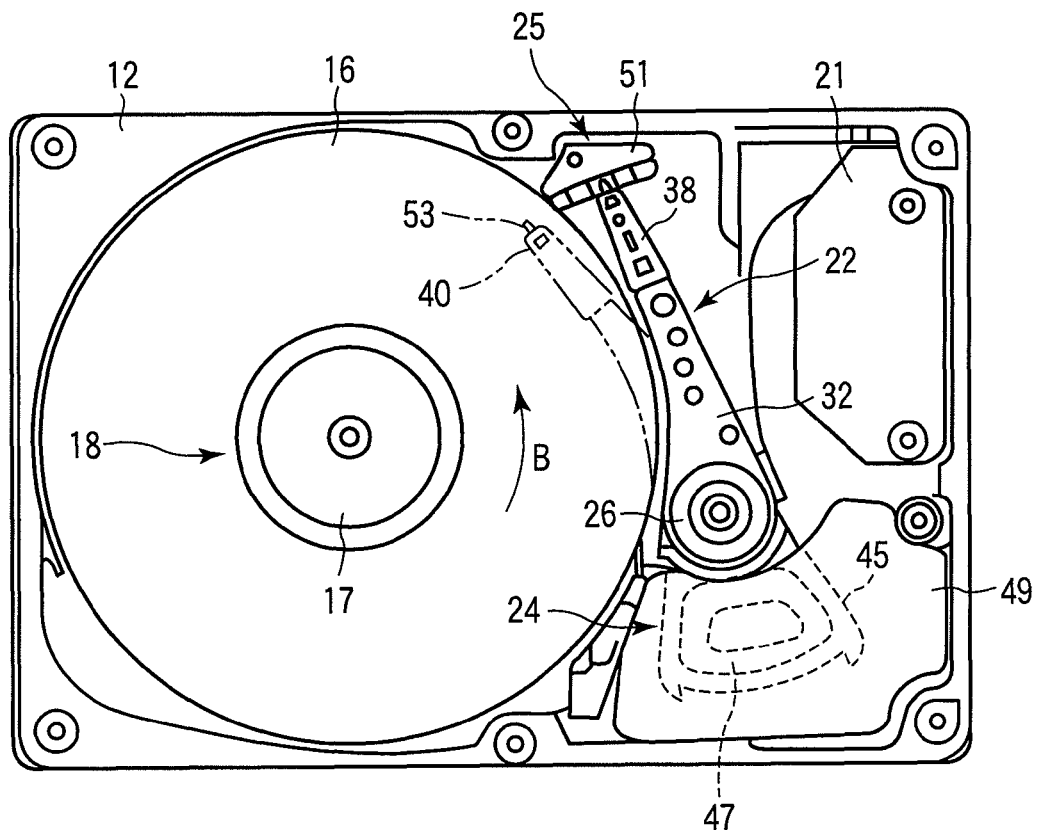
FIG. 1 is an exemplary plan view showing an HDD according to a first embodiment of the invention.

FIG. 1 shows the internal structure of the HDD with its top cover removed. As shown in FIG. 1, the HDD includes a base 12 in the form of an open-topped rectangular box and a top cover (not shown). The top cover is fastened to the case by screws so as to close a top opening of the case.

The base 12 contains a magnetic disk 16, spindle motor 18, magnetic heads 40, carriage assembly 22, voice coil motor (VCM) 24, ramp load mechanism 25, board unit 21, etc. The magnetic disk 16 serves as a recording medium. The spindle motor 18 serves as a drive section that supports and rotates the disk. The magnetic heads write and read information to and from the disk. The carriage assembly 22 supports the heads for movement with respect to the disk 16. The VCM 24 rotates and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) is screwed to the outer surface of a bottom wall of the base 12. The circuit board controls the operations of the spindle motor 18, VCM 24, and magnetic heads 40 through the board unit 21.

The magnetic disk 16 has magnetic recording layers on its upper and lower surfaces, individually. Further, a DTR disk is used as the magnetic disk 16. Indentations are formed in a surface of this disk, that is, grooves are formed between adjacent tracks, whereby interference between the adjacent tracks is reduced to improve the recording density. The disk 16 is fitted on a hub (not shown) of the spindle motor 18 and fixed on the hub by a clamp spring 17. If the motor 18 is driven, the disk 16 is rotated at a predetermined speed in the direction of arrow B.

The carriage assembly 22 is provided with a bearing portion 26, which is fixed on the bottom wall of the base 12, and arms 32 extending from the bearing portion. The arms 32 are located parallel to the surfaces of the magnetic disk 16 and spaced apart from one another. Further, the arms 32 extend in the same direction from the bearing portion 26. The carriage assembly 22 is provided with suspensions 38 that are elastically deformable elongated plates. Each suspension 38 is formed of a leaf spring, of which the proximal end is fixed to the distal end of its corresponding arm 32 by spot welding or adhesive bonding and which extends from the arm. The magnetic heads 40 are supported on the respective distal end portions of the suspensions 38. Each suspension 38 may be formed integrally with its corresponding arm 32. The arms 32 and suspensions 38 constitute a head suspension, and the head suspension and magnetic heads 40 constitute a head suspension assembly.

Figure 2:
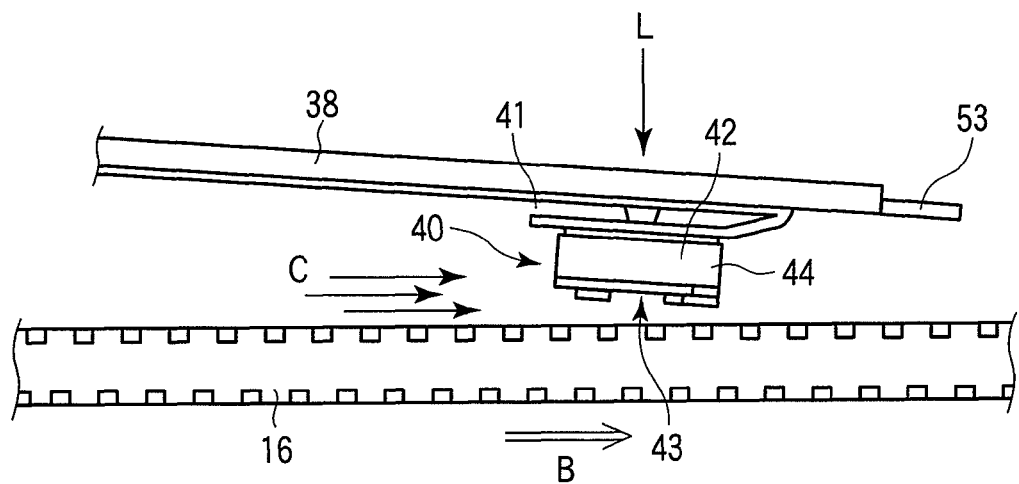
FIG. 2 is an exemplary enlarged side view showing a magnetic head and magnetic disk portion of the HDD.

As shown in FIG. 2, each magnetic head 40 includes a slider 42 substantially in the shape of a rectangular parallelepiped and read/write head portion 44 on the slider. The head 40 is fixed to a gimbal spring 41 that is provided on the distal end portion of each suspension 38. Each head 40 is subjected to a head load L that is directed to a surface of the magnetic disk 16 by the elasticity of the suspension 38.

As shown in FIG. 1, the carriage assembly 22 includes a support frame 45 that extends from the bearing portion 26 oppositely from the arms 32. The support frame 45 supports a voice coil 47 that constitutes a part of the VCM 24. The support frame 45 is molded from a synthetic resin and formed integrally on the outer periphery of the voice coil 47. The coil 47 is located between a pair of yokes 49 that are fixed on the base 12 and, in conjunction with these yokes and a magnet (not shown) fixed to one of the yokes, constitutes the VCM 24. If the voice coil 47 is energized, the carriage assembly 22 rotates around the bearing portion 26, whereupon each magnetic head 40 is moved to and positioned in a region over a desired track of the magnetic disk 16.

The ramp load mechanism 25 includes a ramp 51 and tabs 53. The ramp 51 is provided on the bottom wall of the base 12 and located outside the magnetic disk 16. The tabs 53 extend individually from the respective distal ends of the suspensions 38. As the carriage assembly 22 rotates to its retracted position outside the disk 16, each tab 53 engages with a ramp surface on the ramp 51 and is then pulled up along the slope of the ramp surface, whereupon each magnetic head 40 is unloaded.

Figure 3:
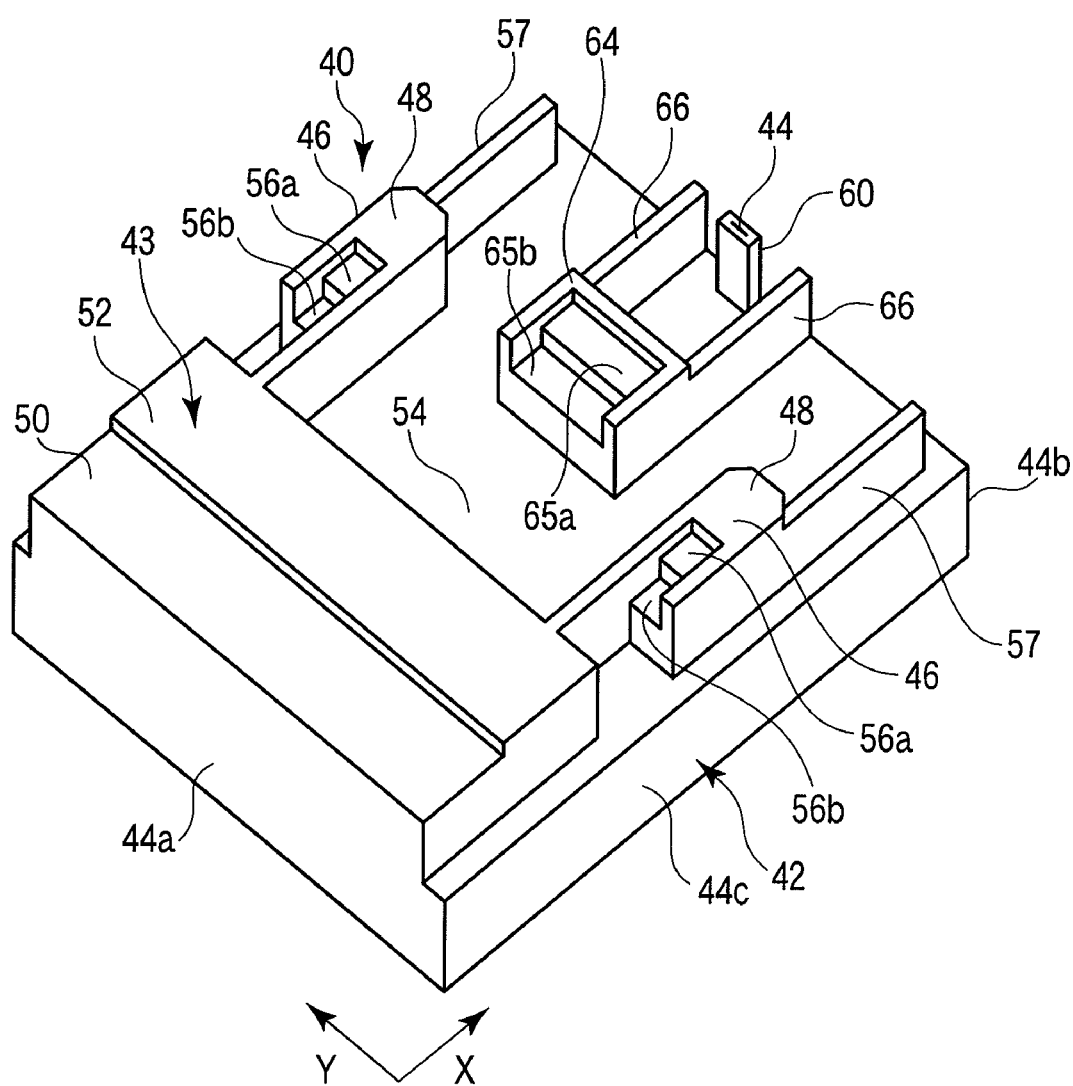
FIG. 3 is an exemplary perspective view showing the disk-facing surface side of a slider of the magnetic head.

The following is a detailed description of a configuration of each magnetic head 40. FIG. 3 is a perspective view showing the disk-facing surface side of the magnetic head, FIG. 4 is a plan view of the slider, and FIG. 5 is a sectional view of the slider.

Figure 4:
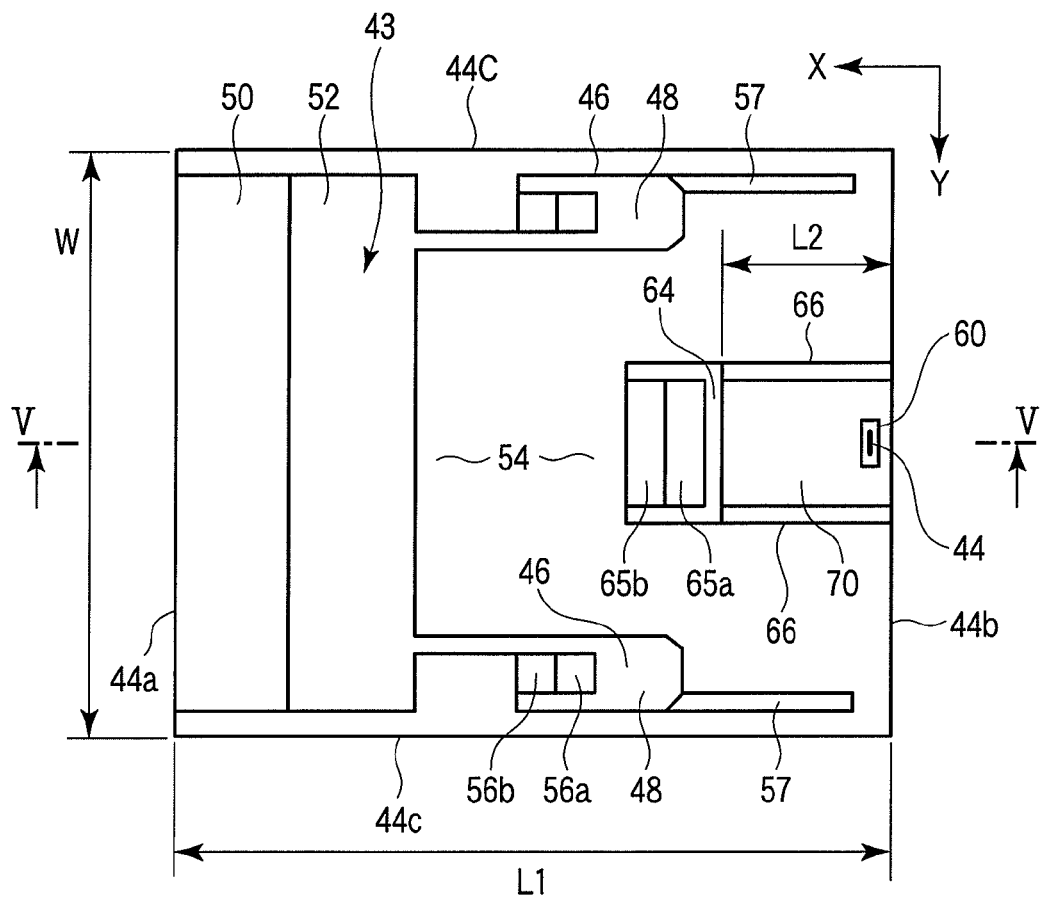
FIG. 4 is an exemplary plan view showing the disk-facing surface side of the slider.
Figure 5:
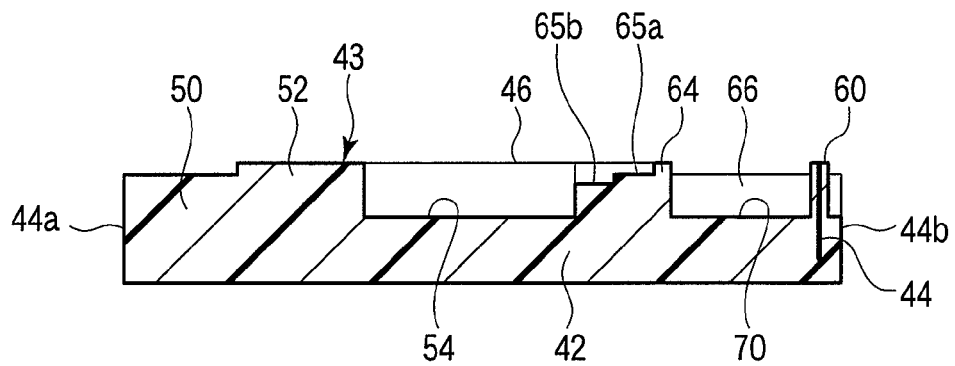
FIG. 5 is an exemplary sectional view taken along line V-V of FIG. 4.

As shown in FIGS. 3 to 5, the magnetic head 40 includes the slider 42 substantially in the shape of a rectangular parallelepiped. The slider has a rectangular disk-facing surface (ABS) 43, inflow-end face 44a, outflow-end face 44b, and a pair of side faces 44c. The disk-facing surface 43 faces a surface of the magnetic disk 16. The inflow- and outflow-end faces 44a and 44b extend at right angles to the disk-facing surface. The side faces 44c extend between the end faces 44a and 44b and at right angles to the disk-facing surface.

The longitudinal direction of the disk-facing surface 43 is assumed as a first direction X, and the transverse direction perpendicular thereto as a second direction Y. The slider 42 is formed as a so-called femto slider, having a length L of 1.25 mm or less, e.g., 0.85 mm, in the first direction X and a width W of 1.00 mm or less, e.g., 0.70 mm, in the second direction Y.

The magnetic head 40 is constructed as a flying head, in which the slider 42 is flown by airflows C (see FIG. 2) that are produced between the disk surface and the disk-facing surface 43 as the magnetic disk 16 rotates. When the HDD is operating, the disk-facing surface 43 of the slider 42 never fails to be opposed to the disk surface with a gap therebetween. The direction of the airflows C is coincident with the direction of rotation B of the disk 16. The slider 42 is located so that the first direction X of the disk-facing surface 43 opposed to the surface of the disk 16 is substantially coincident with the direction of the airflows C.

As shown in FIGS. 3 to 5, a negative-pressure cavity 54 is formed ranging from the substantial center of the disk-facing surface 43 to the outflow-end side. The cavity 54 is a recess that opens toward the outflow-end face 44b. The slider 42 is formed to be, for example, 0.23 mm thick, and the cavity 54 to be 600 to 1,500 nm, e.g., 1,500 nm, deep. The negative-pressure cavity 54 serves to produce a negative pressure on the central part of the disk-facing surface 43 at every feasible yaw angle for the HDD.

A substantially rectangular leading step portion 50 is formed on the inflow end portion of the disk-facing surface 43. The leading step portion 50 is one level lower than the disk-facing surface 43 and projects upward with respect of the bottom surface of the negative-pressure cavity 54. The leading step portion 50 is located on the inflow side of the cavity 54 with respect to the airflows C and extends substantially throughout the length of the slider 42 in the second direction Y.

The disk-facing surface 43 is formed with a pair of side portions 46 that extend along the side edges of the surface 43 and are opposed to each other with a space in the second direction Y between them. The side portions 46 protrude from the bottom surface of the negative-pressure cavity 54. The side portions 46 extend from the leading step portion 50 toward the outflow-end of the slider 42. The leading step portion 50 and the pair of side portions 46 are located symmetrically with respect to a central axis of the slider 42. As a whole, they are formed to be substantially U-shaped, closed on the inflow-end side and open to the outflow-side. The leading step portion 50 and side portions 46 define the negative-pressure cavity 54.

In order to maintain the pitch angle of the magnetic head 40, a leading pad 52 that uses an air film to support the slider 42 protrudes from the leading step portion 50. The leading pad 52 extends continuously throughout the area that covers the width of the leading step portion 50 in the second direction Y, and is formed in a position deviated on the outflow-end side from the inflow-end face 44a of the slider 42.

A side pad 48 is formed on each side portion 46 and leads to the leading pad 52. The pads 52 and 48 are formed substantially flat and form the disk-facing surface 43.

A first recess 56a and second recess 56b are continuously formed in each side pad 48. The first and second recesses 56a and 56b open toward the inflow-end side of the disk-facing surface 43 as well as toward the magnetic disk surface. Each of the recesses 56a and 56b has a rectangular shape defined by a pair of side edges, which extend substantially parallel to the first direction X, and a bottom edge, which connects the respective extended ends of the side edges and extends substantially parallel to the second direction Y. The second recess 56b is one level deeper than the first recess 56a.

The disk-facing surface 43 of the slider 42 is formed with a pair of side skirts 57 that individually extend straight in the first direction X from the side portions 46 toward the outflow-end of the slider. Each side skirt 57 is formed to be deeper than each side portion 46 and projects form the bottom surface of the negative-pressure cavity 54. Each side skirt 57 is, for example, 100 to 200 nm below the disk-facing surface 43.

The slider 42 includes a head mounting pad 60, positive-pressure generating pad 64, and a pair of center skirts 66. The head mounting pad 60 is disposed on the outflow end portion of the disk-facing surface 43. The pad 64 is arranged on the disk-facing surface 43 in a position at a distance L2 from the outflow end of the slider. The center skirts 66 are arranged on the outflow-end side with respect to the positive-pressure generating pad 64.

The head mounting pad 60 has a sufficiently small rectangular shape. It is located on the central axis of the slider 42 and projects from the bottom of the negative-pressure cavity 54. The pad 60 forms a part of the disk-facing surface 43. The head portion 44 of the magnetic head 40 includes a recording element and reproducing element, which record and reproduce information on and from the magnetic disk 16. The reproducing and recording elements are embedded in the head mounting pad 60 and have a read/write gap (not shown) that is defined in the pad 60.

The positive-pressure generating pad 64 is, for example, rectangular, and is located on the central axis of the slider 42, and projects from the bottom of the negative-pressure cavity 54. The upper surface of the pad 64 is flush with the leading pad 52 and side pads 48 and forms a part of the disk-facing surface 43. The width of the positive-pressure generating pad 64 in the second direction is greater than that of the head mounting pad 60.

The length L2 from the positive-pressure generating pad 64 to the outflow end of the slider 42 is set to be 7 to 30% (position of each side portion), or preferably 15% or more, of a length L1 between the inflow and outflow ends of the slider 42 and shorter than the distance between each side portion 46 and the outflow end of the slider.

A first recess 65a and second recess 65b are continuously formed in the positive-pressure generating pad 64. The first and second recesses 65a and 65b open toward the inflow end of the disk-facing surface 43 as well as toward the magnetic disk surface. Each of the recesses 65a and 65b has a rectangular shape defined by a pair of side edges, which extend substantially parallel to the first direction X, and a bottom edge, which connects the respective extended ends of the side edges and extends substantially parallel to the second direction Y. The second recess 65b is one level deeper than the first recess 65a.

The pair of center skirts 66 extend in the first direction X from the outflow end of the positive-pressure generating pad 64 to that of the disk-facing surface 43. The center skirts 66 are opposed to each other in the second direction Y with a space therebetween substantially equal to the width of the pad 64. The center skirts 66 are formed to be shallower than the negative-pressure cavity 54 and deeper than the positive-pressure generating pad 64. The positive-pressure generating pad 64 and center skirts 66 define a negative-pressure generating region 70. The head mounting pad 60 is located between the center skirts 66.

According to the HDD and head suspension assembly constructed in this manner, the magnetic head 40 is flown by the airflows C that are produced between the disk surface and disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head 40 flies in an inclined posture such that the read/write gap of the head portion 44 is located closest to the disk surface.

Since the disk-facing surface 43 of the slider 42 is provided with the negative-pressure cavity 54, the magnetic head 40 can produce a negative pressure on the central part of the surface 43 at every feasible yaw angle for the HDD. The head mounting pad 60 that is just large enough to be mounted with the read/write elements is located at the outflow end portion of the slider 42, that is, at a trailing portion. The positive-pressure generating pad 64 on the outflow-end side is arranged in a position deviated from the outflow-end side of the slider 42 toward the inflow-end side such that it is not easily exposed to the irregularities of the magnetic disk surface. Further, the center skirts 66 that extend from the positive-pressure generating pad 64 to the outflow-end side of the slider are provided to increase the production of negative pressure on the trailing side. By doing this, the flying height of the head can be kept from varying under the influence of fine dust produced during machining of the disk.

Figure 6A:
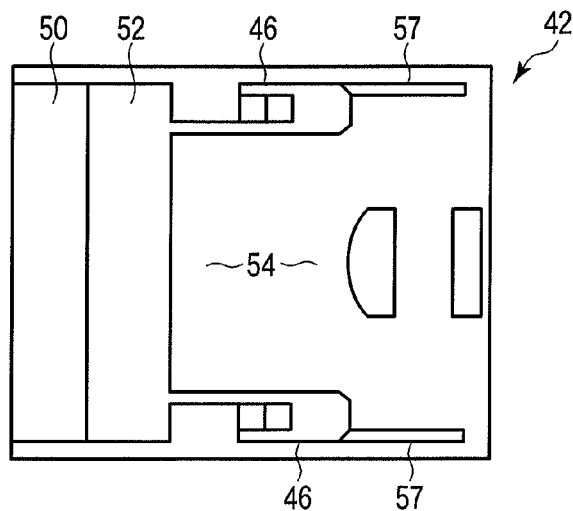
FIGS. 6A, 6B and 6C are exemplary plan views showing sliders according to Comparative Examples 1 and 2 and the present embodiment, respectively.
Figure 6B:
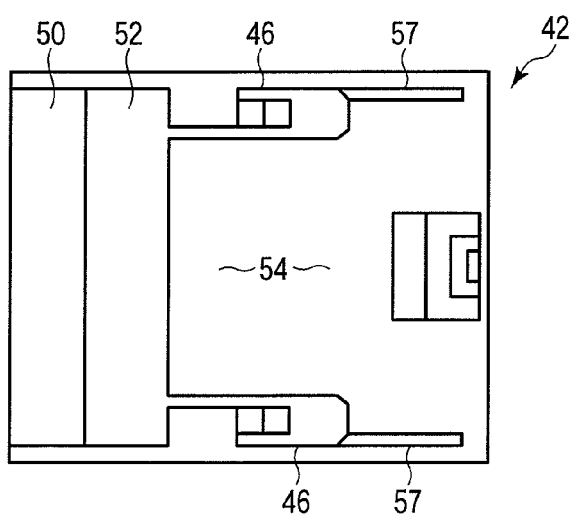
Figure 6C:
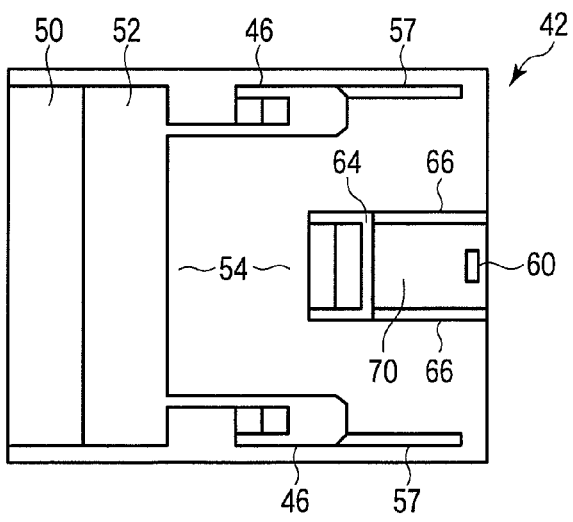

As shown in FIGS. 6A, 6B, 6C, the inventors hereof prepared sliders according to Comparative Examples 1 and 2 and the slider according to the present embodiment, and comparatively analyzed these sliders for generated pressure distribution and variation of the flying height attributable to rugged surfaces of magnetic disks.

In the slider according to Comparative Example 1, as shown in FIG. 6A, pads on the trailing side include a head mounting pad at the outflow end and positive-pressure generating pad nearer to the inflow end, but no center skirts. In the slider according to Comparative Example 2, as shown in FIG. 6B, a head mounting pad and positive-pressure generating pad are collectively disposed on the outflow end portion of a disk-facing surface. Other configurations of the sliders of Comparative Examples 1 and 2 are the same as those of the slider according to the present embodiment shown in FIG. 6C.

FIGS. 7A, 7B, 7C show pressure distributions of the sliders of Comparative Examples 1 and 2 and the present embodiment, respectively. In the slider of the present embodiment, the length L2 from the positive-pressure generating pad 64 to the outflow end of the slider 42 is assumed as 19% of the length L1 between the inflow and outflow ends of the slider 42.

In the slider of Comparative Example 1, no substantial positive or negative pressure is produced around the head mounting pad and positive-pressure generating pad. In the slider of Comparative Example 2, a high positive pressure is produced at the outflow end of the slider. According to the slider of the present embodiment, as seen from FIG. 7C, a positive pressure is produced by the positive-pressure generating pad 64 in a position deviated from the outflow end of the slider 42 toward the inflow-end side, while a negative pressure is increased in the negative-pressure generating region 70 on the outflow-end side of the positive-pressure generating pad.

Figure 8:
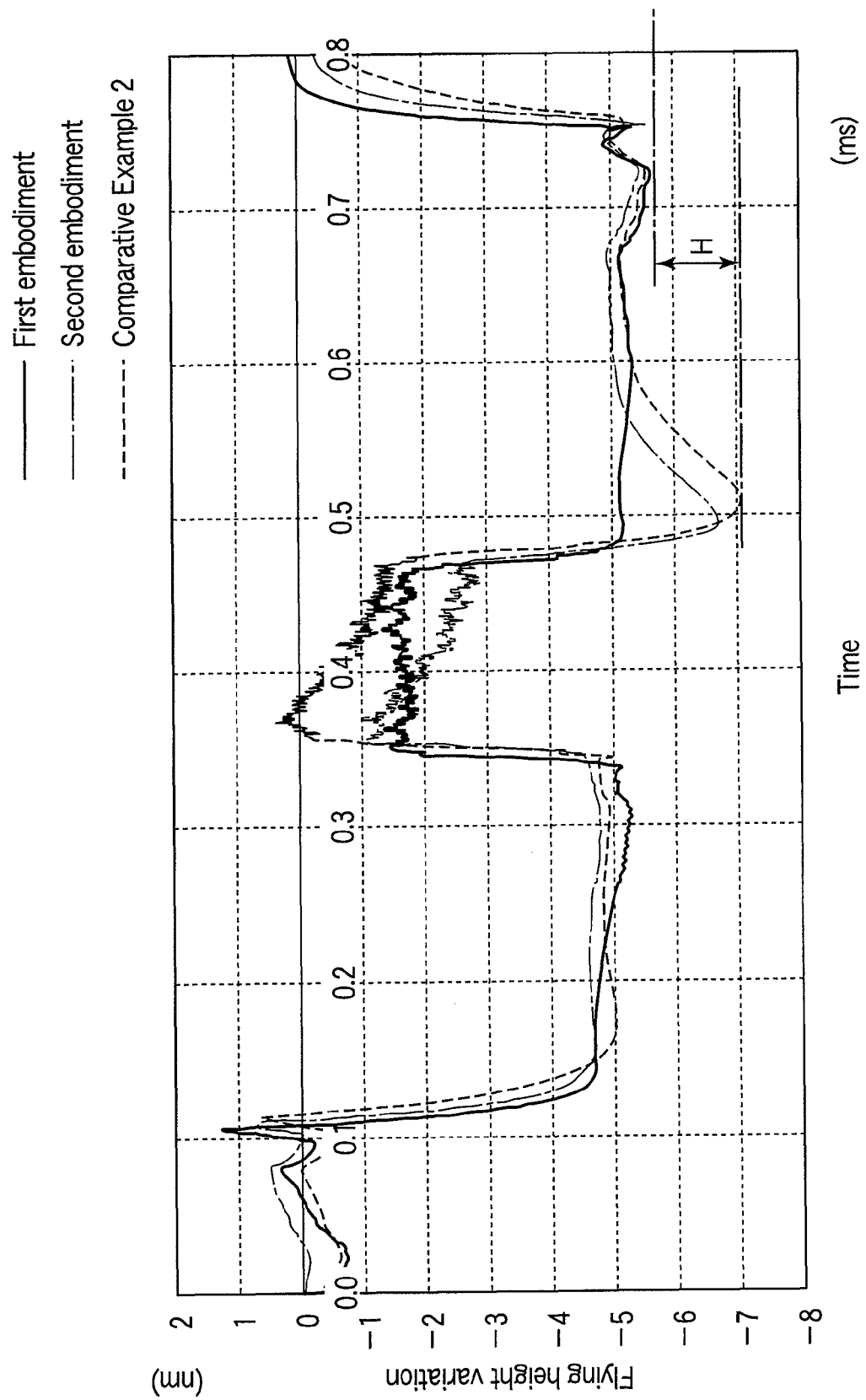
FIG. 8 is an exemplary diagram showing results of simulation of flying height variation for the sliders of Comparative Example 2 and the first embodiment.

FIG. 8 shows results of simulation of the flying height variation attributable to the irregularities of the magnetic disk surface for the sliders of Comparative Example 2 and the first embodiment and a slider of a second embodiment. As seen from FIG. 8, the flying height variation of the slider of the present embodiment is less than that of the slider of Comparative Example 2. For Example, the lowest point of the flying height of the slider of the present embodiment is different from that of the slider of Comparative Example 2 by a height H, indicating a reduction of about 20% in the flying height variation.

In the slider of the second embodiment, the length L2 from the positive-pressure generating pad 64 to the outflow end of the slider 42 is set to be 7% of the length L1 of the slider 42. It can be seen that the flying height variation of the slider of the second embodiment is lower than that of the slider of Comparative Example 2.

In the case of the head according to the present embodiment, the flying height variation is assumed to be suppressed by (1) shifting the positive-pressure generating position of the trailing portion toward the leading side to increase the distance from the magnetic disk surface to the positive-pressure generating position so that the influence of the irregularities of the disk surface is reduced and (2) setting the center skirts to recover a negative pressure loss compared with the case where the positive-pressure generating position is simply moved to the leading side.

Thus, on magnetic disks such as DTR disks that involve irregularities, a positive pressure produced at each pad portion of the slider 42 changes as the irregularities of the disk surface change or due to fine dust that is produced during machining of the media. In the case of the slider of Comparative Example 2 where the positive pressure is produced at the outflow end, therefore, the positive-pressure generating position is closest to the disk surface, thus it is easily influenced by the irregularities of the disk surface. In consequence, the flying height varies considerably.

In order to suppress the influence of the irregularities, it is necessary to secure a large distance from the disk surface to the positive-pressure generating surface of the slider, especially that of the trailing pad portion. If the positive-pressure generating pad is only moved to the leading side, as in Comparative Example 1, however, the efficiency of positive-pressure generation is reduced, thus the pad must be enlarged. In consequence, the area of negative-pressure generation is inevitably subject to loss.

As in the present embodiment, therefore, the flying height variation of the head that is influenced by the irregularities of the magnetic disk surface or fine dust produced during disk machining can be suppressed to improve reliability and stability by (1) locating the head mounting pad 60 of a minimum necessary size for carrying the read/write elements at the trailing portion of the slider 42 (two-part trailing structure), (2) producing a positive pressure for the trailing portion on the leading side that is susceptible to the influence of the irregularities of the disk surface, and (3) increasing the production of negative pressure on the trailing side by means of the center skirts.

Accordingly, there may be provided a head with improved reliability and stability, capable of suppressing variation of the flying height of a slider, a head suspension assembly provided with the head, and a disk drive.

The following is a description of heads according to alternative embodiments of the invention. FIG. 9 schematically shows a magnetic head 40 of a disk drive according to a second embodiment. According to the magnetic head 40 of the disk drive of the second embodiment, a pair of center skirts 66 that extend from a positive-pressure generating pad 64 of a slider 42 toward an outflow end extend from the positive-pressure generating pad to the opposite sides of a head mounting pad 60. Specifically, the pair of center skirts 66 extend to a position just short of the outflow end of the slider 42.

FIG. 10 shows a magnetic head 40 of a disk drive according to a third embodiment. According to this embodiment, a pair of center skirts 66 that extend from a positive-pressure generating pad 64 of a slider 42 toward an outflow end are opposed to each other in the second direction Y with a space therebetween greater than the width of the positive-pressure generating pad.

Other configurations of the sliders 42 of the second and third embodiments are the same as those of the slider according to the first embodiment. Therefore, like reference numbers are used to designate like parts throughout the several views of the drawing, and a detailed description of those parts is omitted. According to the second and third embodiments, there may also be provided a head with improved reliability and stability, capable of suppressing variation of the flying height of a slider, a head suspension assembly provided with the head, and a disk drive.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc., of the leading step portion, side portions, positive-pressure generating pad, and head mounting pad of the slider are not limited to the embodiments described herein and may be varied as required. This invention is not limited to femto sliders and may also be applied to pico sliders, pemto sliders, or other larger sliders. The number of magnetic disks used in the disk drive may be increased without being limited to one.

What is claimed is:

1. A head comprising:
   a slider comprising a surface configured to face a surface of a rotatable recording medium and to fly by an airflow between the surface of the recording medium and the surface as the recording medium rotates; and
   a head portion on the slider, configured to record information on the recording medium and to reproduce information from the recording medium,
   the surface of the slider comprising a first direction along the airflow and a second direction perpendicular to the first direction,
   the slider comprising:
      a negative-pressure cavity defined by a recess in the surface and configured to produce a negative pressure,
      a leading step portion on the surface and on an inflow side of the negative-pressure cavity with respect to the airflow,
      a pair of side portions on the surface, extending from the leading step portion toward an outflow end of the slider, and facing each other with a space between the pair in the second direction,
      a head mounting pad on the surface on an outflow side of the negative-pressure cavity with respect to the airflow with the head portion,
      a positive-pressure generating pad on the surface at a predetermined distance from the head mounting pad, on the inflow side with respect to the airflow, and configured to produce a positive pressure, and
      a pair of center skirts on the outflow side of the positive-pressure generating pad and being shallower than the negative-pressure cavity.

2. The head of claim 1, wherein a length between the positive-pressure generating pad and the outflow end of the slider is substantially 7% or more of a length between an inflow end and the outflow end of the slider, and the positive-pressure generating pad is closer to the outflow-end side of the surface than the side portions.

3. The head of claim 1, wherein the center skirts are extending from the positive-pressure generating pad to the outflow end of the surface, and the head mounting pad is between the center skirts.

4. The head of claim 1, wherein the center skirts are extending from the positive-pressure generating pad to the opposite sides of the head mounting pad, respectively.

5. The head of claim 3, wherein the positive-pressure generating pad comprises a width in the second direction, and the pair of center skirts are facing each other in the second direction at a distance substantially equal to the width of the positive-pressure generating pad.

6. The head of claim 3, wherein the positive-pressure generating pad comprises a width in the second direction, and the pair of center skirts are facing each other in the second direction at a distance greater than the width of the positive-pressure generating pad.

7. The head of claim 1, wherein the slider comprises a pair of side skirts on the surface, extending in the first direction from the side portions toward the outflow end of the slider, and being deeper than the side portions.

8. A head suspension assembly in a disk drive comprising a disk recording medium and a drive module configured to support and rotate the recording medium, the head suspension assembly comprising:
   a head comprising a slider comprising a surface configured to face a surface of a rotatable recording medium and to fly by an airflow between a surface of the recording medium and the surface as the recording medium rotates, and a head portion on the slider and configured to record information on the recording medium and to reproduce information from the recording medium; and
   a head suspension configured to support the head while moving with respect to the recording medium, wherein
   the surface of the slider comprises a first direction along the airflow and a second direction perpendicular to the first direction,
   the slider comprises:
      a negative-pressure cavity defined by a recess in the surface and configured to produce a negative pressure,
      a leading step portion on the surface and on an inflow side of the negative-pressure cavity with respect to the airflow,
      a pair of side portions on the surface, extending from the leading step portion toward an outflow end of the slider, and facing each other with a space between the pair in the second direction,
      a head mounting pad on the surface on an outflow side of the negative-pressure cavity with respect to the airflow with the head portion,
      a positive-pressure generating pad on the surface at a predetermined distance from the head mounting pad, on the inflow side with respect to the airflow, and configured to produce a positive pressure, and
      a pair of center skirts on the outflow side of the positive-pressure generating pad and being shallower than the negative-pressure cavity.

9. A disk drive comprising:
   a disk recording medium;
   a drive module configured to support and rotate the recording medium;
   a head comprising a slider comprising a surface configured to face a surface of a rotatable recording medium and to fly by an airflow between a surface of the recording medium and the surface as the recording medium rotates, and a head portion on the slider configured to record information on the recording medium and to reproduce information from the recording medium; and
   a head suspension configured to support the head while moving with respect to the recording medium, wherein
   the surface of the slider comprises a first direction along the airflow and a second direction perpendicular to the first direction,
   the slider comprises:
      a negative-pressure cavity defined by a recess in the surface and configured to produce a negative pressure,
      a leading step portion on the surface and on an inflow side of the negative-pressure cavity with respect to the airflow,
      a pair of side portions on the surface, extending from the leading step portion toward an outflow end of the slider, and facing each other with a space between the pair in the second direction,
      a head mounting pad on the surface on an outflow side of the negative-pressure cavity with respect to the airflow with the head portion,
      a positive-pressure generating pad on the surface at a predetermined distance from the head mounting pad, on the inflow side with respect to the airflow, and configured to produce a positive pressure, and
      a pair of center skirts on the outflow side of the positive-pressure generating pad and being shallower than the negative-pressure cavity.

* * * * *